March 28, 1944.   K. SCHRÖTER ET AL   2,345,158
WHEELED UNDERFRAMES, ESPECIALLY FOR TRAILERS OF MOTOR CARS
Filed Jan. 13, 1941   2 Sheets-Sheet 1
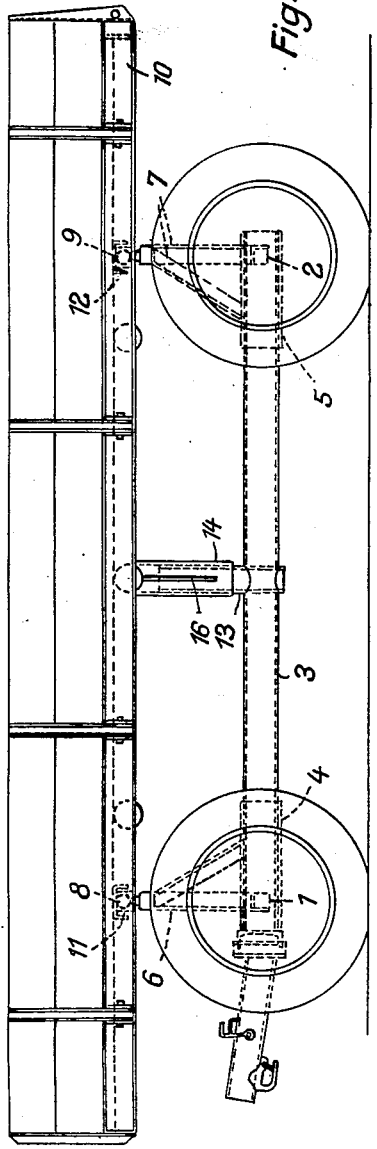
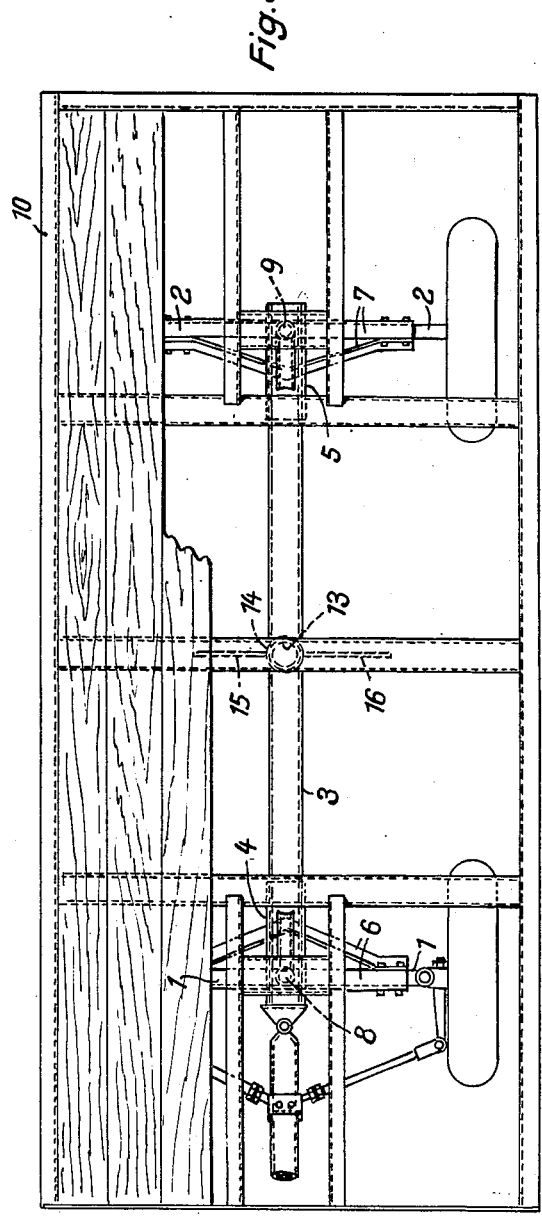
Inventors:
Kurt Schröter and Hans Schröter
BY
Richards & Geier
ATTORNEYS Inventors:
Kurt Schröter and Hans Schröter Patented Mar. 28, 1944

2,345,158

UNITED STATES PATENT OFFICE 2,345,158

WHEELED UNDERFRAME, ESPECIALLY FOR TRAILERS OF MOTORCARS

Kurt Schröter and Hans Schröter, Wechmar, Gotha-Land, Germany; vested in the Alien Property Custodian Application January 13, 1941, Serial No. 374,216
In Germany April 14, 1938

6 Claims. (Cl. 280—112)

This invention relates to wheeled underframes, especially such suited for trailers of motor cars and having the wheel axles supported on the longitudinal middle carrier of the underframe in such a manner as to be able to oscillate thereon, the thus arranged axles being connected with one another by a compensating member.

The present improved construction is distinguished from the known wheeled motor car underframes in which a separate compensating lever is used which connects the axles oscillating counter to one another by the feature that the compensating member is formed by the body of the car, the body being pivotally supported in the vertical longitudinal middle plane of the car on supports firmly connected with the wheel axles, the body being, furthermore, rotatably supported on a vertical pivot firmly secured to the longitudinal middle carrier. The compensating member, thus formed, causes the front and rear axles to be properly co-ordinated so that movement of one of the axles about its pivot is compensated by the properly compensating movement of the other axle. By utilizing the body itself as compensating member and doing away, therefore, with separate compensating members the manufacture of the cars is simplified and rendered less expensive, as well as sturdier, particularly since separate joints required when separate compensating members are used are eliminated; finally, the weight of the cars is reduced.

Figure 2:
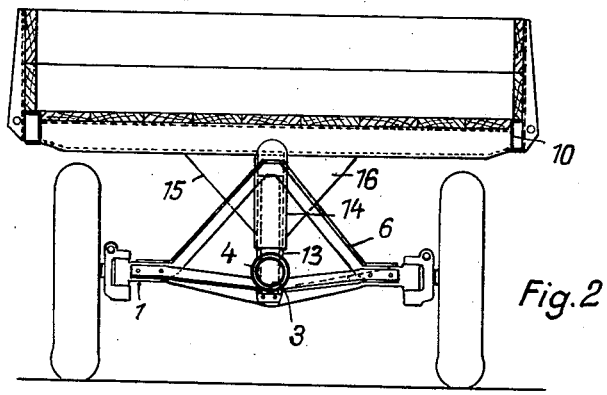
Figure 4:
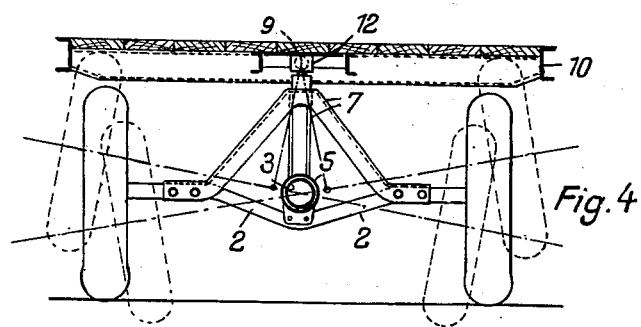
Figure 5:
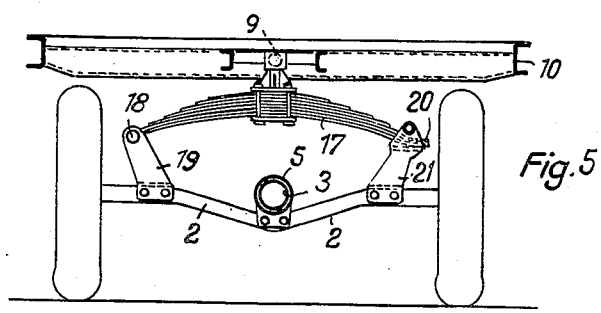

The invention is illustrated diagrammatically and by way of examples on the accompanying drawings, in which Figure 1 is a side-view of a car designed according to our invention; Figure 2 is a front view of the same car; Figure 3 is a plan thereof; Figure 4 shows a rear view, and Figure 5 is a view similar to Fig. 3 or 4 and shows a somewhat modified constructional form in which the axles are provided with springs.

On the drawings 1 denotes the front axle and 2 the rear axle which both are mounted for pivotal movement about a carrier 3 and may for this purpose be firmly connected with sleeves 4, 5 supported turnably upon the longitudinal middle carrier 3. Said axles are, furthermore, equipped with supporting struts 6 and 7 carrying at their upper ends globular pivots 8 and 9, situated within correspondingly shaped sockets 11 and 12 which are rigidly connected with the body of the car, so that the body rests upon the axles 1 and 2 by the intermediary of the ball-joints 8, 9, 11 and 12, formed by said pivots and sockets.

The longitudinal carrier 3 is equipped between the axles 1 and 2 with an upwardly directed pivot 13 upon which is mounted a hollow cylindrical lug 14 having a somewhat larger diameter and being rigidly connected with the body 10. Said lug may, besides, be connected with the body by gusset plates 15 and 16. The body can, therefore, be turned in the horizontal plane on the pivot 13, whereas it is held in the vertical plane by said pivot, as well as by the longitudinal carrier 3 and the axles 1 and 2. It assumes, therefore, compulsorily a middle position between said axles when these are turned around the carrier 3.

The axles 1 and 2 which are mounted upon the carrier 3 by the intermediary of their sleeves 4 and 5 are prevented from being withdrawn from said carrier by the ball-joints 8, 9, 11 and 12 which constitute the connection between the said axles and the body 10. When this latter is lifted off from the ball-joints 8 and 9, the axles, or their sleeves 4 and 5 respectively, can be freely shifted along the longitudinal carrier 3 and easily be withdrawn therefrom so that a car designed according to this invention can be assembled and taken to pieces in an extraordinarily convenient manner.

One of the two surfaces of the cylinder parts 13 and 14 which slide upon one another can be provided in known manner with a covering of asbestos, compressed peat, or any equivalent material able to obviate metallic friction at this place, as well as wear and tear of the parts 14 and 15 and rendering at the same time movement of the body 10, or of the axles 1 and 2 respectively, difficult. In order to increase this effect the sleeve 14 which is situated upon the vertical pivot 13 and is firmly connected with the body, or with the longitudinal middle carrier respectively, is slotted and so designed as to permit re-tensioning.

The modification illustrated in Fig. 5 differs from the above described construction by the feature that at least one leaf-spring 17 is inserted between the axle 2 and the ball-pivot 9. Said spring is secured at its end 18 to the sleeve 19, whereas its end 20 is shiftable upon the support 21 transversely to the direction of motion of the car. Owing to the insertion of said springs 17 the body 10 which constitutes the compensation member is spring-supported with respect to the axles and the car is, therefore, rendered suitable also for higher speeds.

We claim:

1. A car comprising, in combination, a body, at least two wheel axles, a carrier disposed on the central longitudinal plane of the car, means swingably supporting said axles upon said carrier, and a compensation device comprising supports rigidly connected with the said axles and having universal joints supporting said body in the vertical longitudinal middle plane of the car, and a vertical pivot rigidly connected to the carrier at its middle, the body being rotatably mounted on said pivot.

2. A car comprising, in combination, a body, at least two wheel axles, a carrier disposed on the central longitudinal plane of the car, means swingably supporting said axles upon said carrier, and a compensation device comprising supports connected with said axles and adapted to yield elastically in a vertical direction, and having universal joints supporting said body in the vertical longitudinal middle plane of the car, and a vertical pivot rigidly connected to the carrier at its middle, the body being rotatably mounted on said pivot.

3. A car, comprising, in combination, a body, at least two wheel axles, a carrier disposed on the central longitudinal plane of the car, means swingably supporting said axles upon said carrier, and a compensation device comprising supports rigidly connected with the said axles and having universal joints supporting said body in the vertical longitudinal middle plane of the car, a vertical pivot rigidly connected to the carrier at its middle, and a sleeve connected with the body and adapted to turn about said pivot.

4. A car, comprising, in combination, a body, at least two wheel axles, a carrier disposed on the central longitudinal plane of the car, means swingably supporting said axles upon said carrier, and a compensation device comprising a leaf spring support connected with one of said axles and having a universal joint supporting said body in the vertical longitudinal middle plane of the car, and a vertical pivot connected to the carrier at its middle, the body being rotatable about said pivot.

5. A car, comprising, in combination, a body, at least two wheel axles, a carrier disposed on the central longitudinal plane of the car, means swingably supporting said axles upon said carrier and a compensation device comprising a leaf spring support connected with one of said axles and having a universal joint supporting said body in the vertical longitudinal middle plane of the car, arms firmly connected with the said axle and supporting said spring support, and a vertical pivot connected to said carrier at its middle, the body being rotatable about said pivot.

6. In a car, in combination with the car body, at least two wheel axles, a carrier disposed on the central longitudinal plane of the car, means swingably supporting said axles upon said carrier, and a compensation device comprising supports yieldably connected with said axles and having universal joints supporting said body in the vertical central plane of the car, a vertical pivot carried by said carrier at its middle, and a sleeve carried by the body and rotatable about said pivot.

KURT SCHRÖTER.
HANS SCHRÖTER.